United States Patent [19]

Bittar et al.

[11] Patent Number: 5,254,932
[45] Date of Patent: Oct. 19, 1993

[54] CHARGING VOLTAGE CONTROL CIRCUIT FOR BATTERY CHARGERS

[75] Inventors: Hussein I. Bittar, Huntington, Ind.; Richard A. Karlin, Chicago, Ill.

[73] Assignee: MagneTek, Inc., Los Angeles, Calif.

[21] Appl. No.: 634,093

[22] Filed: Dec. 24, 1990

[51] Int. Cl.$^5$ .............................................. H02J 7/04
[52] U.S. Cl. ...................................... 320/23; 320/32; 320/39
[58] Field of Search ...................... 320/17, 18, 20, 21, 320/22, 23, 24, 39, 40, 31, 32

[56] References Cited

U.S. PATENT DOCUMENTS

| | | | |
|---|---|---|---|
| 3,816,806 | 6/1974 | Mas | 320/20 |
| 3,864,617 | 2/1975 | Smith et al. | 320/23 |
| 4,233,553 | 11/1980 | Prince, Jr. et al. | 320/23 |
| 4,243,929 | 1/1981 | Lenart | 320/23 |
| 4,876,495 | 10/1989 | Palanisamy | 320/18 |
| 4,924,169 | 5/1990 | Shifflet et al. | 320/39 |

OTHER PUBLICATIONS

Unitrode Linear Integrated Circuits Databook, 1987, pp. 9-87-9-92, Modeling Analysis and Compensation of the Current-Mode Converter, Application Note 7-97.
Unitrode Applications Handbook 1987-1988, pp. 220-233, Application Note U-100, UC3842 Provides Low-Cost Current-Mode Control.
Modern DC-to-DC Switchmode Power Converter Circuits, Rudolf P. Serverns and Gordon (Ed) Bloom, Van Nostrand Reinhyold Company, New York, 1985, chapters 1 and 5, pp. 1-10 and 112, 130-135.
Official Proceedings of the Nineteenth International Power Conversion Conference, Oct. 15-20, 1989, Intertec Communications, Inc., 1989 A New, Continuous-Time Model for Current-Mode Control by Raymond B. Ridley, pp. 455-463.
High-Frequency Switching Power Supplies: Theory and Design, by George Chryssis, McGraw-Hill, 1984, Chapter 2, pp. 5-10; Chapter 3, pp. 11-23; Chapter 8, pp. 149-163.

*Primary Examiner*—Kristine L. Peckman
*Attorney, Agent, or Firm*—Faegre & Benson

[57] ABSTRACT

Charging voltage and current control circuits for battery chargers provide for a constant output voltage above a first predetermined value of charging current and an increasing output voltage below the first predetermined value of charging current. The charger makes use of a pulse-width modulated control circuit utilizing a variable duty cycle proportional to charging current and couples a signal proportional to charging current via a diode-resistor network to the pulse-width modulator for values below the first predetermined value of charging current. A current limit control circuit provides a current limit function by driving the pulse-width modulator to a minimum duty cycle during overcurrent conditions.

11 Claims, 5 Drawing Sheets

5,254,932

CHARGING VOLTAGE CONTROL CIRCUIT FOR BATTERY CHARGERS

BACKGROUND OF THE INVENTION

This invention relates to the field of battery chargers, more particularly those chargers having current mode pulse-width modulated control systems having a variable duty cycle to control charging current.

DETAILED DESCRIPTION

Figure 1:
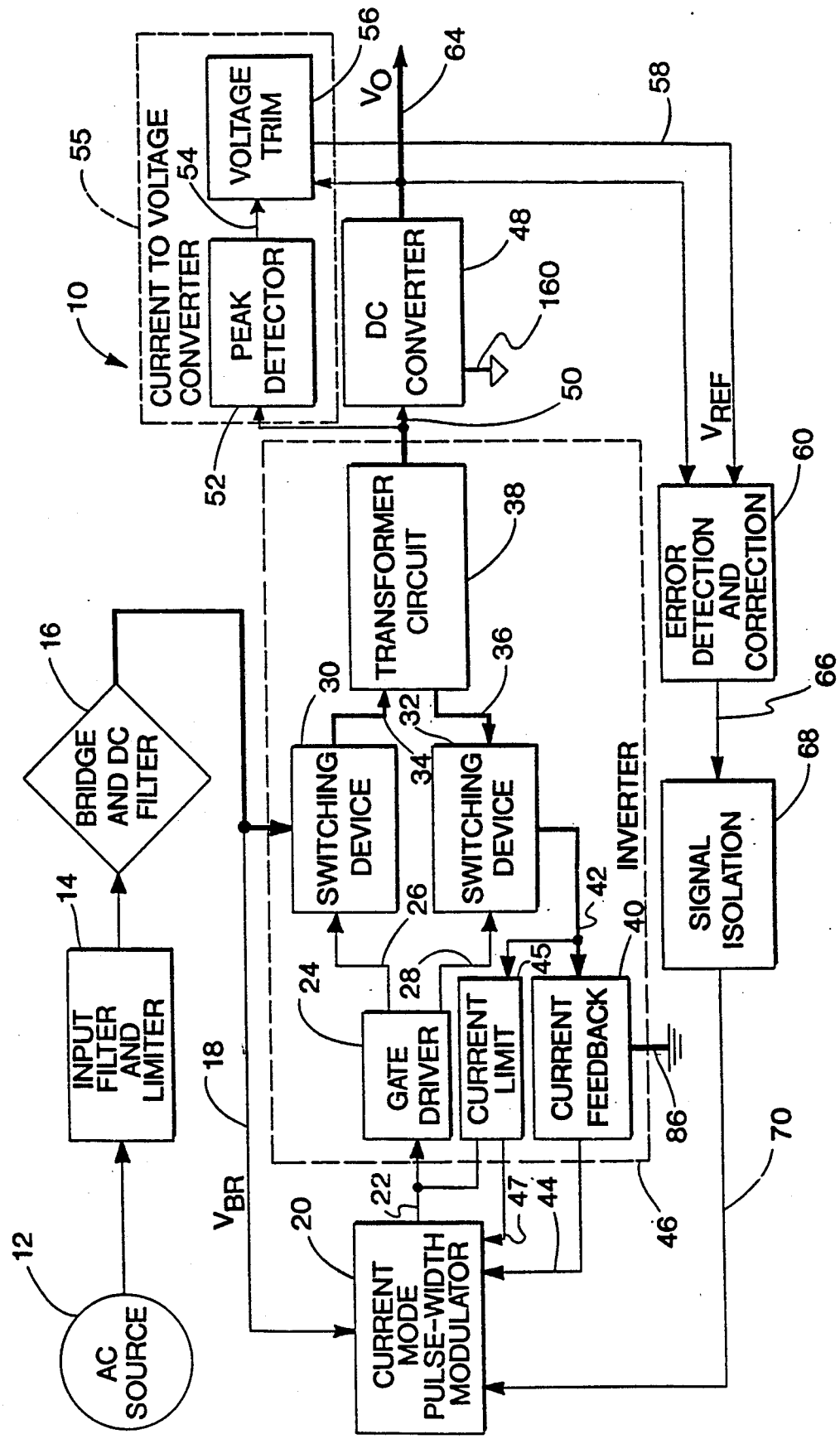
FIG. 1 shows a block diagram of a battery charger utilizing the present invention.

Referring now to FIG. 1, a block diagram of a battery charger 10 may be seen. Charger 10 is preferably connected to an AC source 12 and preferably has a conventional EMI input filter meeting FCC class B specifications. Charger 10 further has a voltage limiter 14 and conventional bridge and DC filter 16. The bridge and DC filter 16 provide a rectified and filtered DC supply 18 on line $V_{BR}$. In a preferred embodiment, supply 18 comprises plus and minus 300 volts DC, with the minus side serving as input circuit common 86 for a current mode pulse-width modulator 20 and an inverter 46 of the charger 10 in a manner well known. Current mode pulse-width modulator 20 supplies a pulse-width modulation signal on line 22 to a gate driver 24. Gate driver 24 supplies separate gate drive signals 26, 28 respectively to a pair of switching devices 30, 32 driven simultaneously and operating in a forward configuration through lines 34, 36 with transformer circuit 38. A current feedback circuit 40 senses inverter current flowing through lines 34, 36 and 42 and provides a current feedback signal on line 44 to modulator 20. A current limit circuit 45 receives a current signal on line 42 and provides a current limit signal on line 47 to the pulse-width modulator 20. Gate driver 24, switching devices 30, 32, transformer circuit 38 and current feedback and limit circuits 40, 45 together make up a relatively high frequency inverter 46 which powers a DC converter 48 through line 50. It is to be understood that line 50 is powered by a secondary winding in circuit 38, thus providing for an isolated output with an isolated output circuit common 160. DC converter 48 provides the main output $V_0$ 64 of charger 10. It is to be understood that line 64 is preferably adapted to be connected to an automotive-type lead-acid 12 volt storage battery (not shown). The output of inverter 46 on line 50 is monitored by a current-to-voltage converter 55 having a peak detector 52 which provides an output signal on line 54 to a voltage trim means or circuit 56. The $V_{REF}$ output of circuit 56 on line 58 is supplied to an error detection and correction circuit 60, along with the $V_0$ voltage on line 64.

Circuit 60 provides an error signal 66 which is isolated from the load side of the converter 10 (i.e., downstream of transformer circuit 38) by a signal isolation means 68. An isolated error signal is provided on line 70 to modulator 20.

The current limit circuit 45 will limit output charging current through control of PWM 20 via line 47 when output charging current exceeds a predetermined value.

Figure 2:
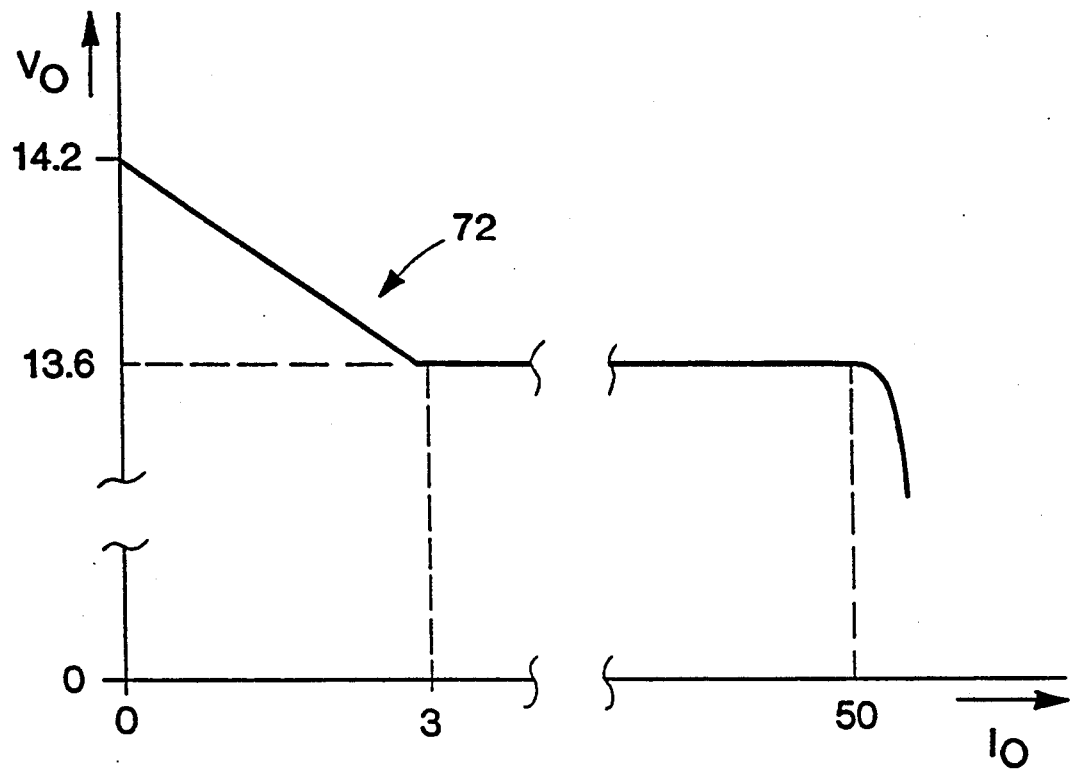
FIG. 2 shows a transfer characteristic relating charging current and charging voltage for the battery charger utilizing the present invention.

Referring now to FIG. 2, a transfer characteristic 72 relating charging current and charging voltage may be seen. The output charging voltage $V_0$ is preferably held at 13.6 volts when output charging current $I_0$ is in a range between first and second predetermined values, preferably 3 and 50 amperes.

It has been found desirable to increase the charging voltage when the charging current is in a range below the first predetermined value, preferably below 3 amperes. The present invention accomplishes an automatic adjustment of charging voltage from 13.6 volts to 14.2 volts as the charging current decreases below 3 amperes. In the embodiment shown, the output or charging voltage increases to 14.2 volts as the charging current decreases to one ampere. For charging currents below one ampere, the charging voltage is held at substantially 14.2 volts. Even though transfer characteristic 72 is shown in FIG. 2 to have a piecewise linear characteristic with corners at the output charging current transition points it is to be understood that in practice the output voltage 64 has smooth transitions at the output charging current transition points.

Above the predetermined maximum value of output charging current, preferably 50 amperes, a current limiting effect may be provided for as indicated in FIG. 2.

Figure 3:
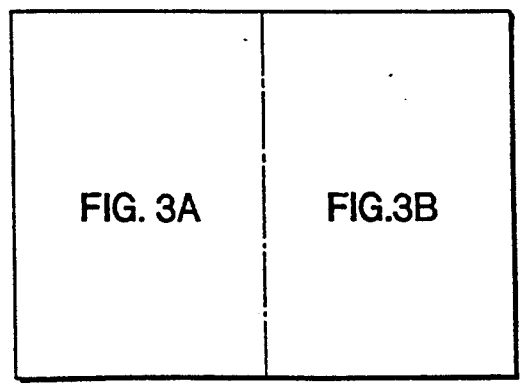
FIG. 3 is a key for FIGS. 3A and 3B.
Figure 3A:
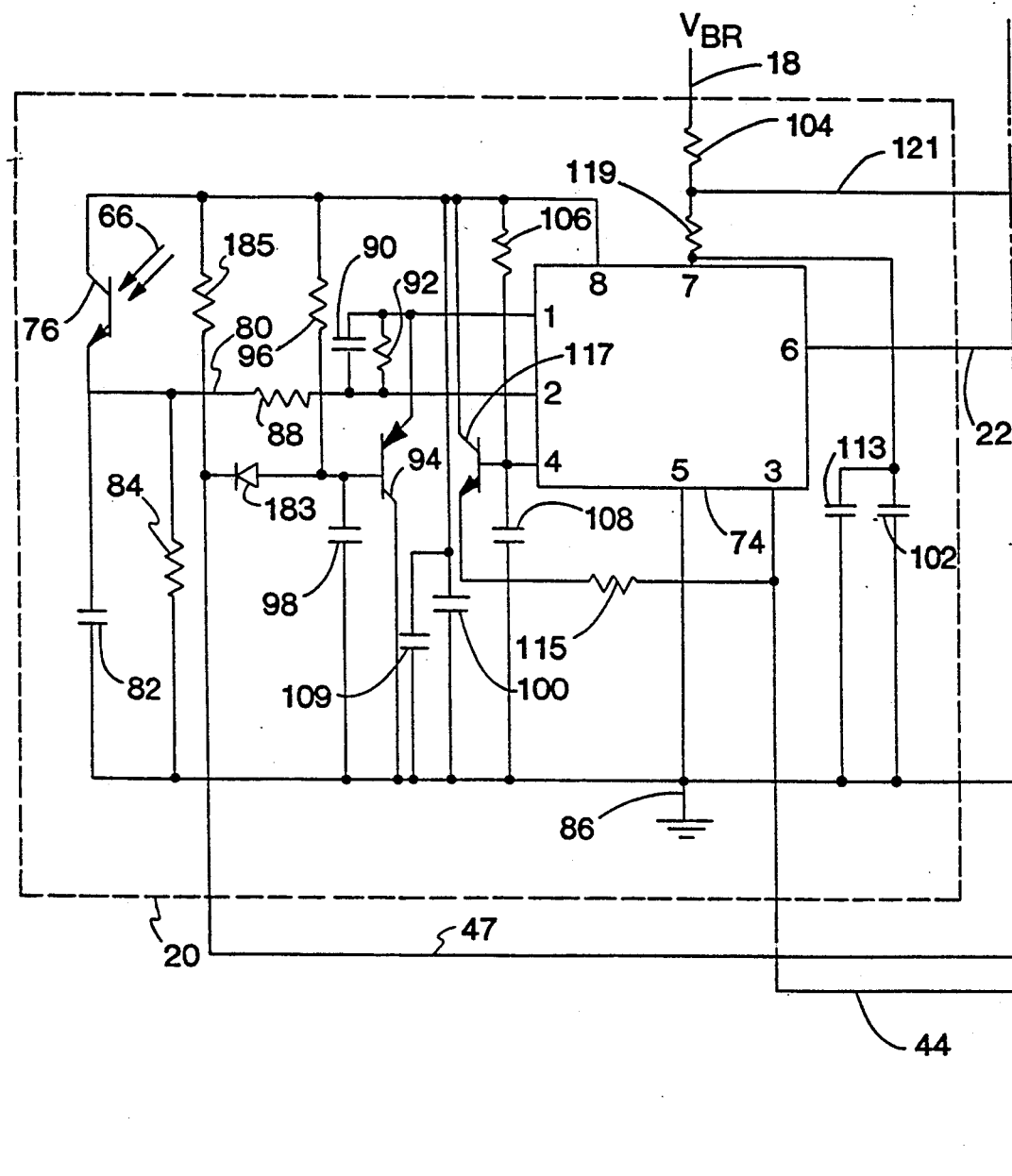
FIG. 3A shows a detailed electrical schematic of the current mode pulse-width modulator and a part of the signal isolation portion of the battery charger utilizing the present invention.
Figure 6:
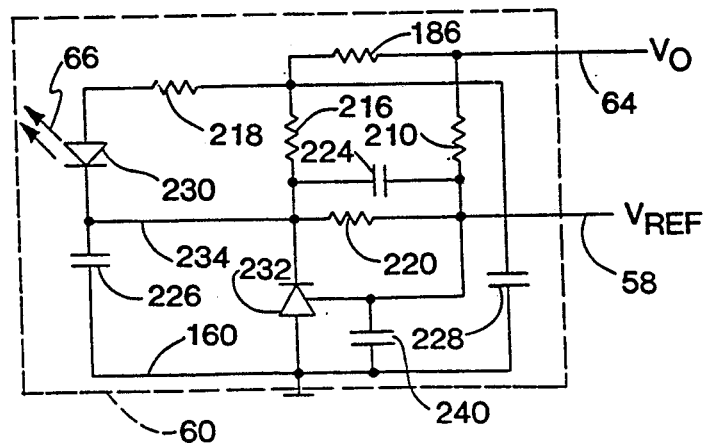
FIG. 6 shows the error detection and correction and a part of the signal isolation portions of the battery charger of FIG. 1 utilizing the present invention.

Referring now to FIG. 3A, the circuit details of modulator 20 may be seen. Modulator 20 preferably includes a pulse-width modulation integrated circuit 74 such as a type 2844 as manufactured by SGS Thompson. Integrated circuit or chip 74 has supporting circuitry as follows: a type H11A1 opto isolator as manufactured by Motorola forms signal isolation means 68. The signal isolation means or opto isolator 68 has an opto-transistor 76 receiving feedback signal 66 on line 70 to control modulation. Referring now also to FIG. 6, signal 66 is provided by opto diode 230 which is also part of the H11A1 opto isolator 68. The duty cycle control line 80 has a 100 pf capacitor 82 and a 3.3 K ohm resistor 84 connected between it and input circuit common 86. It is to be understood that input circuit common 86 is effective for circuitry on the input or supply side of transformer circuit 38. It is also to be understood that input circuit common 86 and $V_{BR}$ 18 are preferably connected across the output of bridge and DC filter 16. A 10 K ohm summing resistor 88 is connected between duty cycle control line 80 and the inverting input or terminal 2 of chip 74. A 1000 pf capacitor 90 and a 13 K ohm resistor 92 are connected between the inverting terminal 2 and the compensation terminal 1 of chip 74.

A 2N2907 type transistor 94 is preferably connected between terminal 1 of chip 74 and input circuit common 86. A 56 K ohm resistor 96 and a 10 mf capacitor 98 provide a base network for transistor 94. A diode 183 and a 4.7 K ohm resistor 185 are also connected to the base of transistor 94 to provide for a current limiting input on line 47. A 0.1 mf capacitor 100 in parallel with a 47 mf capacitor 109 are preferably connected between terminal 8 and terminal 5 of chip 74. A 0.1 mf capacitor 102 is similarly connected in parallel with a 47 mf capacitor 113 between terminals 7 and 5 of chip 74. A 68 ohm resistor 119 is preferably connected between line 121 and terminal 7 of chip 74. A 100 K ohm resistor 104 is preferably connected between $V_{BR}$ line 18 and line 121 resistors 104 and 119 together with capacitor 113 form a filter for the power input terminal 7 of chip 74. A 1.8 K resistor 106 and a 3900 pf capacitor 108 provide an RC network connected between terminals 4 and 8 of chip 74. A 2N3904 type transistor 117 is driven by terminal 4 of chip 74. A 560 ohm resistor 115 is connected between the emitter of transistor 117 and terminal 3 of chip 74 for slope compensation to stabilize the supply. The operating frequency of modulator 74 is preferably 100 KHz.

Figure 3B:
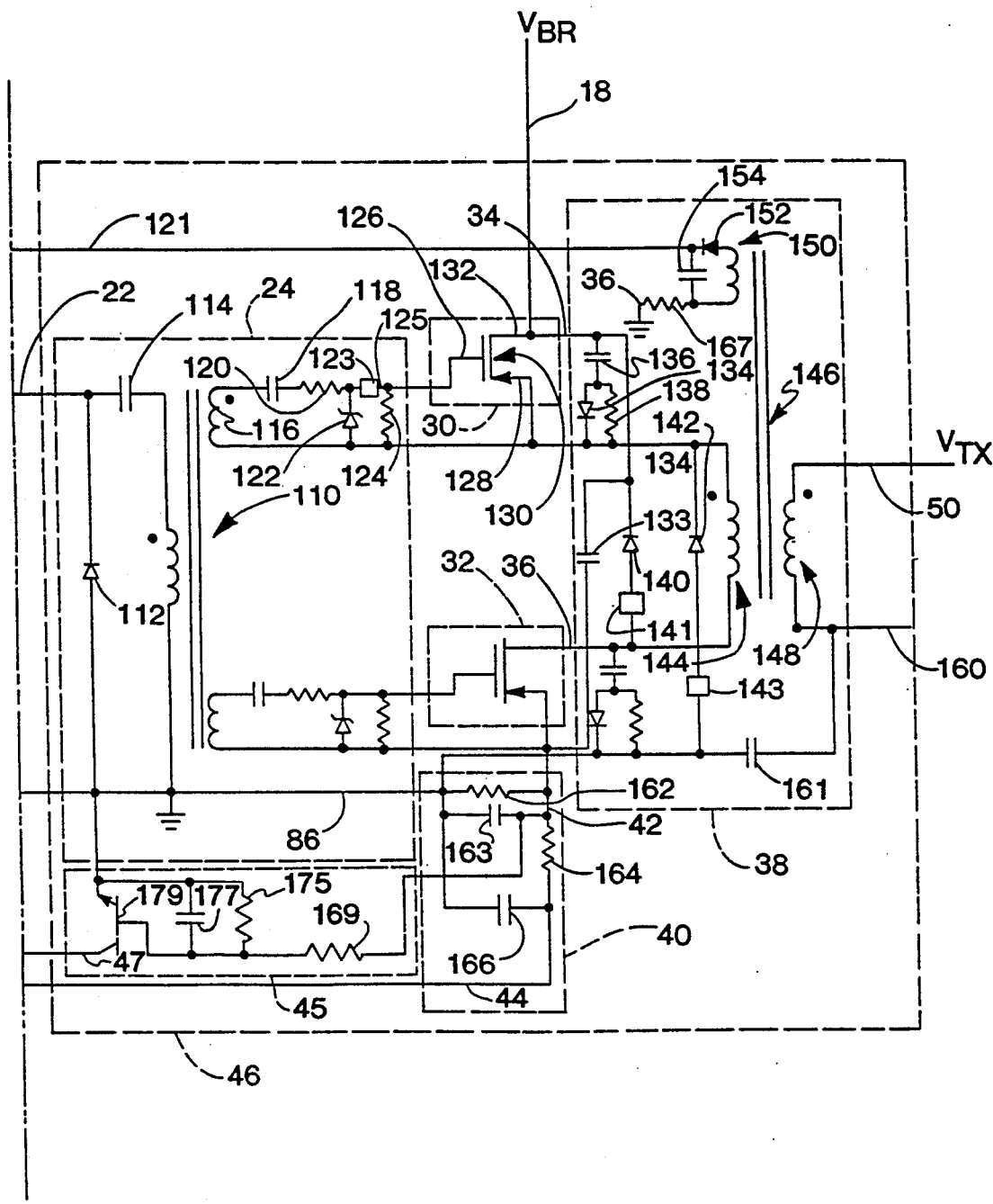
FIG. 3B shows a detailed electrical schematic for the inverter portion of the battery charger utilizing the present invention.

Referring now to FIG. 3B, the details of inverter 46 may be seen. The variable duty cycle pulse-width modulation signal is received on line 22 and coupled to a transformer 110 in gate driver 24 via a 0.22 mf capacitor 114. A 1N5819 diode 112 is connected between line 22 and input circuit common 86. Each of switching devices 30, 32 have identical input and output circuits and hence only one will be described. Transformer 110 has a secondary winding 116 feeding a 0.47 mf capacitor 118 and a 22 ohm resistor 120 to reduce overshoot and ringing which would otherwise occur because of input capacitance of switching transistor 130. A 15 volt zener diode 122 and a 15 K resistor 124 are preferably connected between gate 126 and source 128 of FET transistor 130. Diode 122 clamps the gate-to-source voltage and limits the turn-off signal to 0.6 V negative for transistor 130. Resistor 124 provides a path for gate-source bleeder current of transistor 130. A ferrite bead 123, part no. 2644000101 as manufactured by Fair-Rite Product Corp. of Wallkill, N.Y., is preferably placed around conductor 125 to damp ringing. Transistor 130 is preferably a type IRFP450 MOSFET transistor as manufactured by International Rectifier. A snubber network is preferably connected across drain 132 and source 128 of FET 130. The snubber network is preferably made up of an ultra fast diode 134 (such as is available from General Instrument as a type UF5406 and from Motorola as a type MUR460), a 330 pf capacitor 136 and a 1 K resistor 138 to limit the rate of drain-source voltage rise across FET 130. A pair of diodes 140, 142 are preferably each connected from switching devices 30, 32 to opposite sides of a primary 144 of transformer 146 to return leakage energy back to a primary winding 144 of a main transformer 146 to improve efficiency. Transformer 146 further has a secondary 148 with a step-down turns ratio of 35:6 from primary 144 to secondary 148. Transformer 146 has a further winding 150 for a "keep alive" circuit made up of a UF 4002 diode 152, and a 220 mf capacitor 154. A 68 ohm resistor 167 forms a filter with the winding and stray capacitance to prevent ripple currents from flowing into chip 74. The output from transformer 146 is provided to the DC converter 48 (see FIG. 4) on $V_{TX}$ line 50 and load side common 160.

The current feedback circuit 40 is made up of a 0.07 ohm shunt resistor 162 having a 1 mf capacitor 163 connected across it and a low pass filter combination of 100 ohm resistor 164 and a 1500 pf capacitor 166.

The current limit circuit 45 is made up of a 47 ohm resistor 169 connected with a 240 ohm resistor 175 and a 4700 pf capacitor 177 to the base of a current limiting transistor 179, which may be a type 2N3904. Resistor 185 (in FIG. 3A) provides a collector current path for transistor 179.

Figure 4:
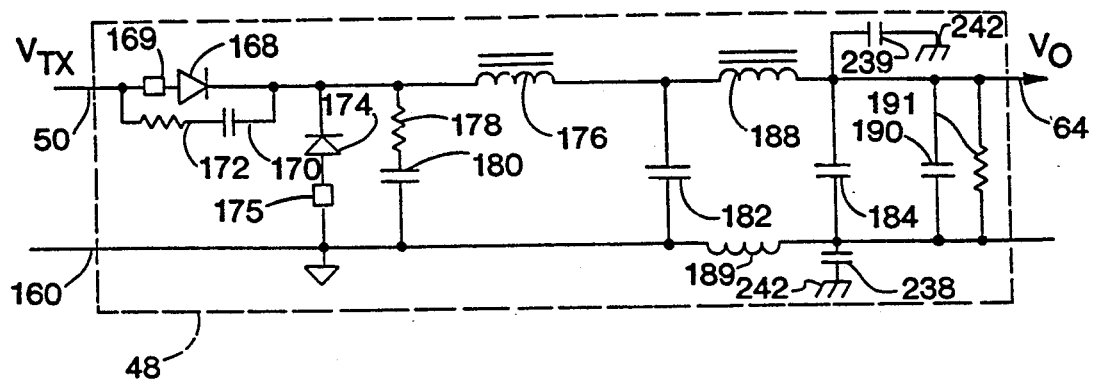
FIG. 4 shows a detailed electrical schematic of the DC converter portion of the battery charger utilizing the present invention.

Referring now to FIG. 4, the circuit details of DC converter 48 may be seen. The $V_{TX}$ output power from the inverter on line 50 is supplied through a diode 168 and an RC snubber made up of a 1000 pf capacitor 170 and an 47 ohm resistor 172. A free wheeling diode 174 cooperates with a 14 uH inductor 176. It is to be understood that diodes 168 and 174 may be a single high current-type device or a parallel combination of lower current rated devices. A further snubber circuit is made up of a 47 ohm resistor 178 and a 1000 pf capacitor 180. A 3300 mf energy storage capacitor 182 provides energy storage for the DC converter 48. A 3300 mf capacitor 184 provides further energy storage for converter 48, and a 2.4 K ohm resistor 191 acts as a bleeder. A pair of 0.5 uH inductors 188, 189 provide high frequency filtering for converter 48, as does a 0.1 mf capacitor 190. A pair of 0.22 mf capacitors 238, 239 are each connected to a mounting stud ground 242 to provide for improved EMI suppression.

Figure 5:
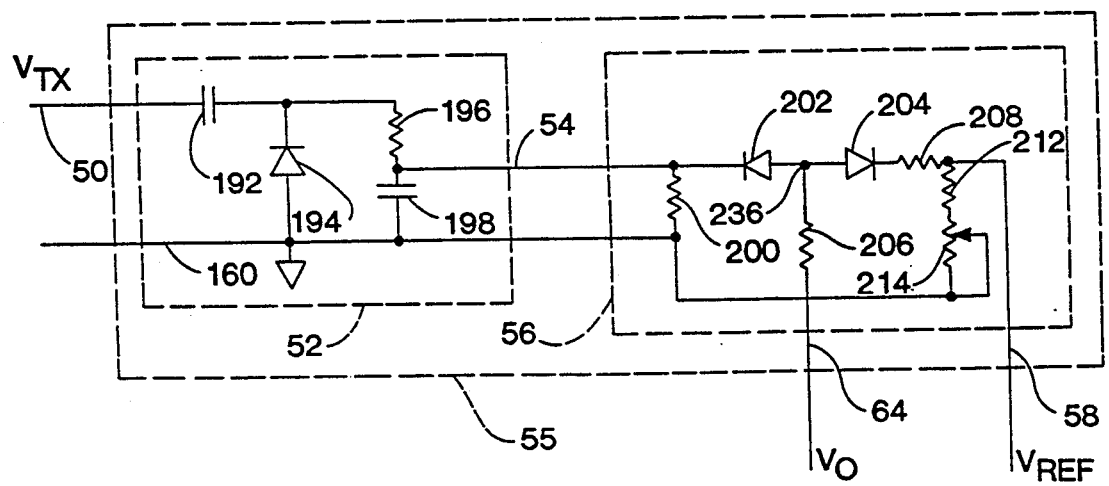
FIG. 5 shows a detailed electrical schematic of the current to voltage converter and its peak detector and voltage trim portions of the present invention.

Referring now to FIG. 5, the details of peak detector 52 and voltage trim circuit 56 may be seen. Detector 52 has a 0.1 mf capacitor 192 and a 4002-type diode 94. A 4.7 K resistor 196 and a 10 mf capacitor 198 provide a voltage integrating function, supplying an integrated or averaged voltage on line 54 to converter 56. Voltage trim circuit 56 has a 510 ohm bleed resistor 200, a pair of 1N4148-type diodes 202, 204, a 100 K summing resistor 206 to receive the $V_0$ signal 64, and 3.3 K and 1.5 K resistors 208, and 212. A 1 K ohm trim pot 214 completes the voltage trim network for $V_{REF}$ line 58.

Referring now to FIG. 6, the details of the error detection and correction subsystem 60 may be seen. Subsystem or circuit 60 receives the $V_0$ signal 64 and the $V_{REF}$ signal 58. It is to be understood that the output from subsystem 60 is an optically coupled signal 66 transmitted to modulator 20 (see FIG. 3A). Circuit 60 includes a 6.2 K ohm resistor 210, a 200 ohm resistor 216, 1 K resistor 218, a 47 K ohm resistor 220, a 0.1 mf capacitor 224, 0.001 mf capacitor 226, a 0.1 mf capacitor 228, and 1000 pf capacitor 240. Circuit 60 includes the diode portion 230 of opto isolator 68. A type TL431 reference amplifier 232 as manufactured by Motorola maintains 2.5 volts on line 58 by closed loop control of the system by regulating the excitation of diode 230 through line 234.

The operation of charger 10 is as follows: Transistor 94, resistor 96 and capacitor 98 function as a "soft start" circuit. Initially transistor 94 clamps terminal 1 of chip 74 to input circuit common 86, and gradually "releases" terminal 1, allowing the pulse width generated by chip 74 to slowly widen to its normal operating condition. This "soft start" avoids saturation of transformer 146 during start up. An "inner" current control loop including modulator 20 controls current in the switching devices 30, 32 and transformer circuit 38 of inverter 46. Chip 74 has an internal error amplifier and reference (not shown) against which the input at terminal 2 is compared. The error amplifier output (at terminal 1 of chip 74) serves as a current reference against which the current feedback at terminal 3 is compared and regulated by chip 74 controlling pulse width, thus controlling the current in switching devices 30, 32 and transformer circuit 38.

Reference amplifier 232 provides an "outer" closed-loop control of output charging voltage 64 by a virtual ground in an op amp (not shown) in reference amplifier 232. The error voltage generated between the inverting and non-inverting inputs is amplified and coupled to pulse width modulator 74 via opto isolator 68. The error signal (now in the form of pulse width modulation) passes through inverter 46 and is converted to a regulated DC output charging voltage by converter 48. More specifically, a two FET inverter 46 operates in a forward current PWM mode with a variable duty cycle. In the current control loop the current flowing through switching devices 30, 32 and transformer circuit 38 is measured by resistor 162 in current feedback circuit 40 and supplied to terminal 3 of PWM chip 74 in modulator circuit 20. The voltage loop error amplifier output at terminal 1 of chip 74 acts as a current reference and the duty cycle on line 22 is varied to supply the output charging current necessary to support the output charging voltage $V_0$ called for on line 64.

Referring to FIGS. 3B and 5, capacitor 192 and diode 194 detect the square wave waveform at secondary 148 of transformer 146. Resistor 196, capacitor 198, and resistor 200 form a charging time constant where resistor 196 is effectively in parallel with resistor 200 to provide a time-averaged signal having an amplitude proportional to pulse width on line 54.

Diodes 202, 204 provide a "switched" biasing network to regulate output voltage $V_0$ on line 64. Resistor 208 is used to isolate line 58 from low impedances upstream in converter 56.

Resistor 210 (see FIG. 6), together with resistors 212 and potentiometer 214 are used to set the voltage on line 64 initially before resistors 206 and 208 are switched in. Resistor 206 is also used to forward bias diode 202.

At no load and for very small loads (zero up to one ampere charging current) the duty cycle is very small on line 22, and the voltage on line 54 is accordingly also relatively small (0.5 to 0.7 volts). The voltage at node 236 is equal to the voltage on line 54 plus a diode forward voltage drop from diode 202. Diode 204 is reversed biased during this condition since the voltage at node 236 is less than the sum of the voltages across diode 204 plus the voltage across resistor 208 plus the voltage $V_{REF}$ on line 58. The output voltage on line 64 is set to 14.2 volts during this condition through the action of a biasing network made up of resistors 210, 212 and potentiometer 214 operating on reference amplifier 232 which, in turn, provides an output voltage error signal through opto-isolator 68 to modulator 20.

For operation between first and second predetermined values of charging current (preferably 1 and 3 amperes), the voltage at line 54 increases as the charging current increases, causing a decrease in the voltage at node 236 which in turn decreases the voltage on line 64 since the voltage on line 64 is equal to the voltage across resistor 206 plus the voltage at node 236. But the current through resistor 206 equals the difference between the current through resistor 200 and the current through resistor 196. Hence, the current through resistor 206 will decrease as the charging current increases because the current through resistor 200 will increase with load and will eventually reverse bias diode 202 at the point where the charging current reaches the predetermined value. Since resistor 206 is a constant value, the voltage across it will decrease, causing the charging voltage on line 64 to decrease as charging current increases up to the predetermined value.

For operation at the predetermined value of 3 amperes and in the range of output charging current from 3 amperes up to the maximum charging current, preferably 50 amperes, the voltage on line 54 will be at a level to reverse bias diode 202 because the voltage at mode 236 is greater than 3.3 volts, the voltage needed to forward bias diode 204. In this operating condition resistors 206 and 208 along with a forward voltage drop in diode 204, are effectively switched in parallel with resistor 210. This combination trims the output voltage on line 64 down to 13.6 volts where it remains constant within preferably ± 3% for output charging currents between 3 and 50 amperes.

Current limiting may be provided to decrease or reduce the output charging voltage on line 64 when the output charging current exceeds a predetermined full load value. The biasing circuit of resistors 169, 175 cause transistor 179 to conduct when output current exceeds a predetermined full load value. Transistor 179 will then turn ON and "pull down" the base of transistor 94 (in FIG. 3A) through diode 183, and in turn will bring pin 1 of IC 74 low, causing PWM 20 to go to a minimum duty cycle operating condition, thus limiting output charging current in line 64.

The invention is not to be taken as limited to all of the details thereof as modifications and variations thereof may be made without departing from the spirit or scope of the invention. For example, it is within the scope of this invention to vary the predetermined values or transition points of charging current from 3 and 1 amperes, or to provide an alternative characteristic transfer function characteristic between the charging current transition points, for example, to have a non-linear characteristic.

What is claimed is:

1. An improved method of operating a lead-acid-battery charger of the pulse-width modulated type having a duty cycle varying in response to charging current to maintain a desired charging voltage comprising the steps of:
   a) holding the charging voltage at a constant voltage when the charging current is above a predetermined value; and
   b) increasing the charging voltage when the charging current is in a range below the predetermined value by sensing the duty cycle and adjusting the charging voltage in response to changes in the duty cycle.

2. The method of claim 1 wherein the charging voltage increases linearly as the charging current decreases below the predetermined value.

3. The method of claim 2 wherein the charging voltage is held constant when the charging current is below the range of the charging current in which the charging voltage is increased.

4. The method of claim 1 wherein the predetermined value of the charging current is 3 amperes.

5. The method of claim 4 wherein the range is between 3 and 1 ampere.

6. The method of claim 1 wherein the charging voltage is held at 13.6 volts when the charging current is above the predetermined value.

7. The method of claim 6 wherein the charging voltage remains substantially constant at 14.2 volts when the charging current is below the range of the charging current in which the charging voltage is increased.

8. An improved charging voltage trim circuit for use in a variable duty cycle pulse-width modulated battery charger of the type having a charging current proportional to the duty cycle, the trim circuit comprising:
  a) a resistor-capacitor averaging network connected to time-average the duty cycle to provide a voltage proportional to the charging current; and
  b) means for coupling the averaging network voltage to an error detection and correction means for controlling a charging voltage output of the battery charger while the charging current is below a predetermined value such that the charging voltage increases as the charging current decreases in a range below the predetermined value of the charging current.

9. The improved charging voltage trim circuit of claim 8 further comprising:
  c) override biasing means for overriding the averaging network voltage when the charging current is above the predetermined value such that the charging voltage is held constant for values of the charging current above the predetermined value.

10. An output charging voltage trim circuit for use in a variable duty cycle battery charger of the type providing an output charging voltage delivered by a pulse-width modulated inverter driving a DC converter to provide an output charging current proportional to the duty cycle, the trim circuit comprising:
  a) a first capacitor connected to an input of the DC converter to provide AC coupling of the inverter output;
  b) a first resistor connected in series with the first capacitor to receive the AC coupled inverter output;
  c) a second capacitor connected in series with the first resistor and operable with the first resistor to form a duty cycle integrator;
  d) a second resistor connected in parallel with the second capacitor to continuously discharge the second capacitor is proportional to the duty cycle of the pulse-width modulated inverter; and
  e) coupling means for coupling the voltage across the second capacitor to a pulse modulation input when the output charging current is below a predetermined value such that the output charging voltage increases in proportion to decreases in the output charging current below the predetermined value.

11. The output charging voltage trim circuit of claim 10 wherein the coupling means further comprises a diode-resistor network biased to block the voltage across the second capacitor when the output charging current is at or above the predetermined value to maintain the output charging voltage substantially constant.

* * * * *